No. 787,194. PATENTED APR. 11, 1905.
W. KRUSE & T. M. VANDERWERTH.
BALING PRESS.
APPLICATION FILED MAR. 7, 1904.
3 SHEETS—SHEET 1.
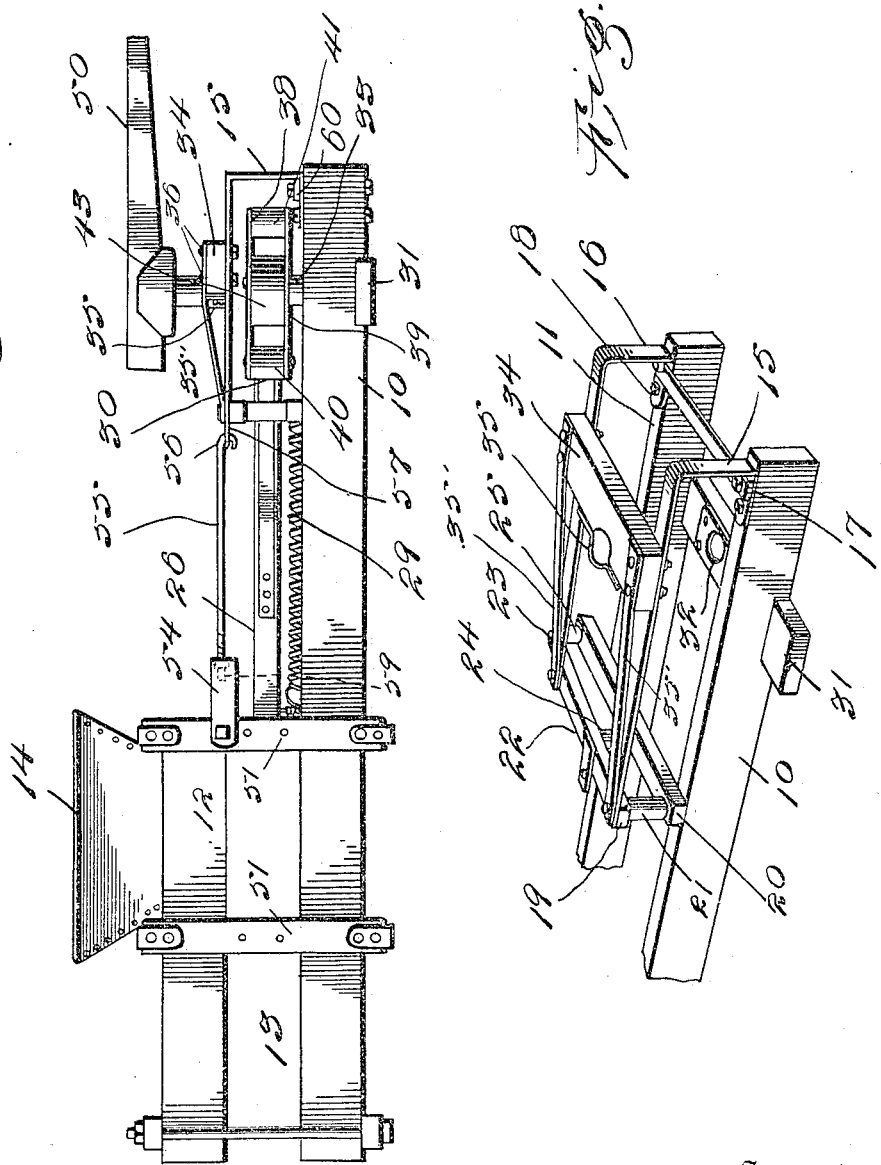
Witnesses
Inventors
William Kruse
Theodor M. Vanderwerth
By
Attorneys

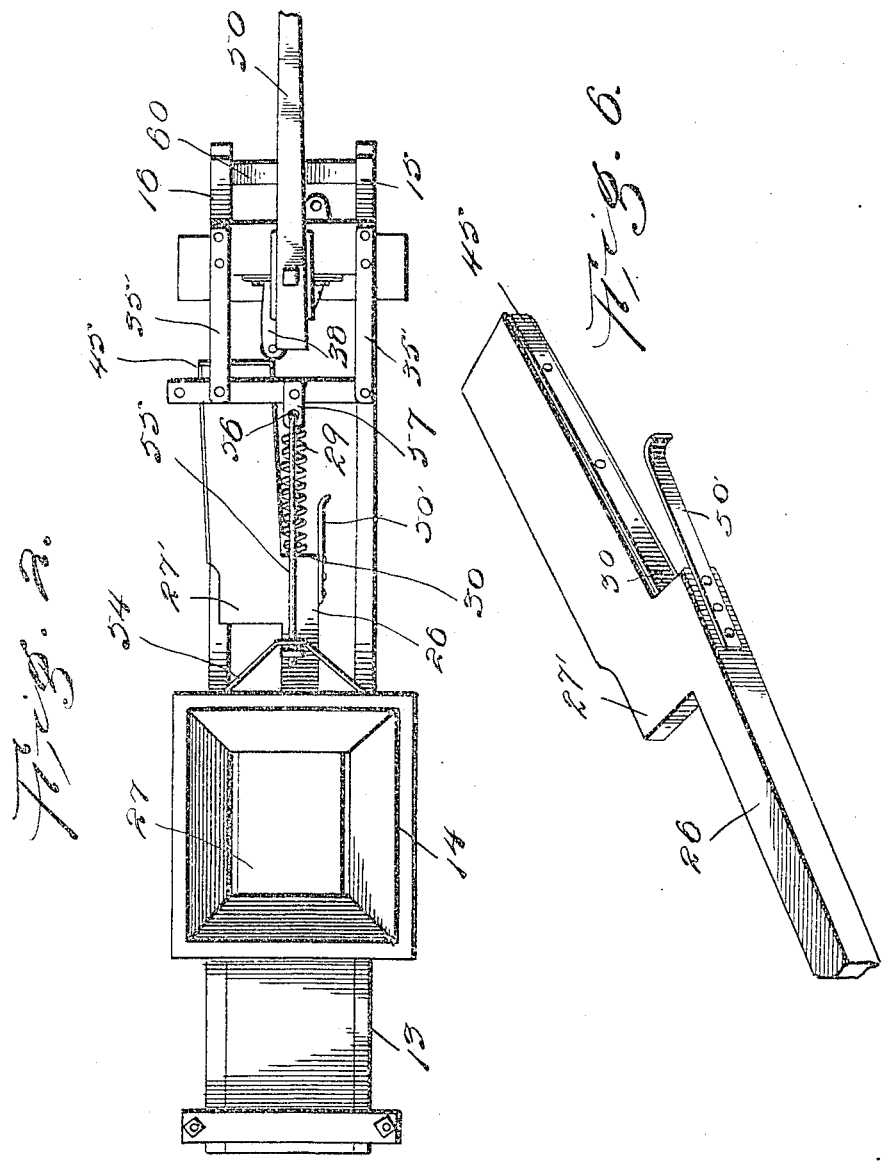

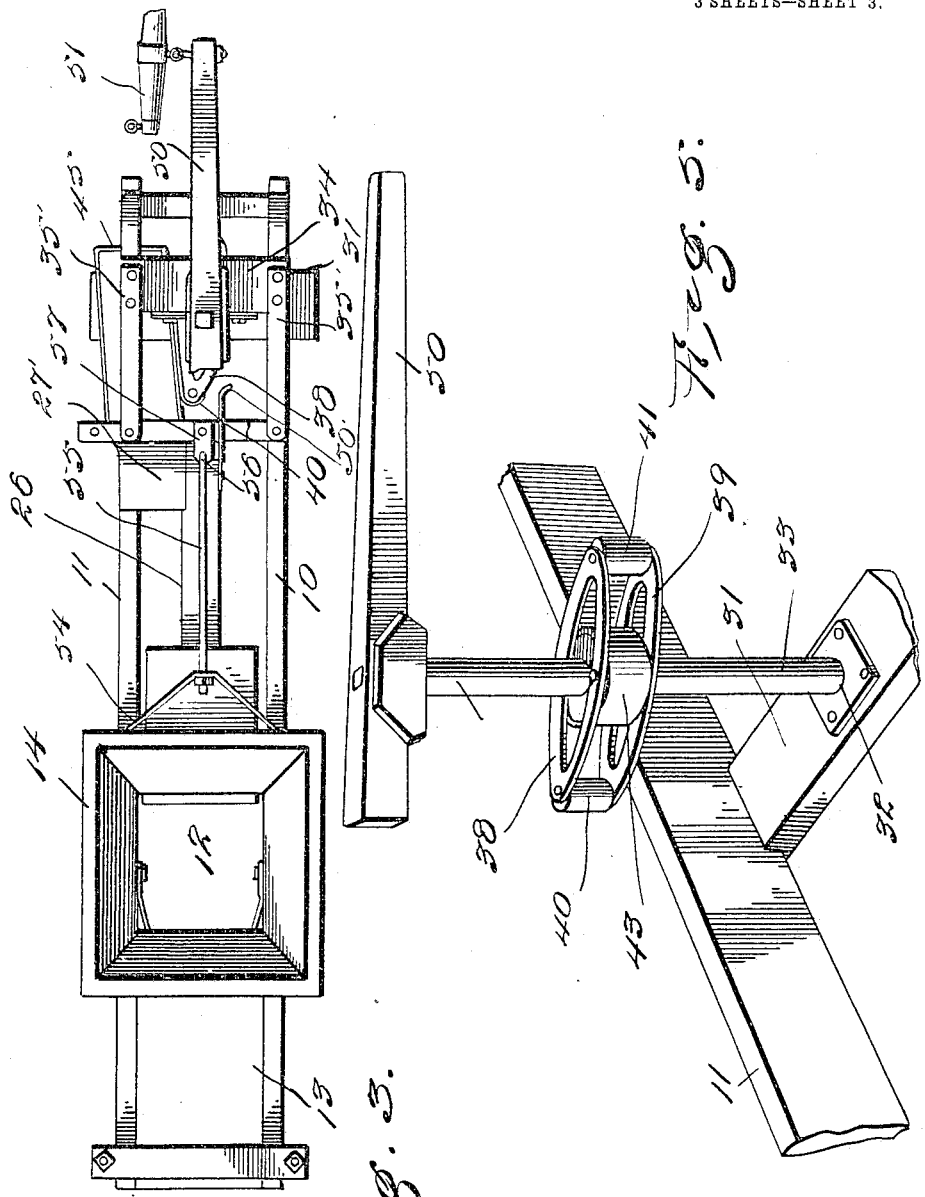

No. 787,194.

Patented April 11, 1905.

UNITED STATES PATENT OFFICE.

WILLIAM KRUSE AND THEODOR M. VANDERWERTH, OF LEDBETTER, TEXAS.

BALING-PRESS.

SPECIFICATION forming part of Letters Patent No. 787,194, dated April 11, 1905.

Application filed March 7, 1904. Serial No. 197,022.

*To all whom it may concern:*

Be it known that we, WILLIAM KRUSE and THEODOR M. VANDERWERTH, citizens of the United States, residing at Ledbetter, in the county of Fayette, State of Texas, have invented certain new and useful Improvements in Baling-Presses; and we do hereby declare the following to be a full, clear, and exact description of the invention, such as will enable others skilled in the art to which it appertains to make and use the same.

This invention relates to baling-presses, and more particularly to that class employed for baling hay, the object of the invention being to provide a press, comprising a rotatable sweep or lever for attachment of draft-animals, in which the continuous movement of the sweep will effect a reciprocation of the plunger in connection with a return-spring and in which the sweep will be held against lost motion after releasing the plunger, so that the load will not be suddenly released, and in consequence the draft-animals will not lurch forwardly and the draft appliances on the sweep will not strike the legs of the draft-animals.

A further object of the invention is to provide a construction wherein the parts will be so formed and arranged as to insure a rigid structure and one which will be efficient in its operation under all conditions.

In the drawings forming a portion of this specification, and in which like numerals of reference indicate similar parts in the several views, Figure 1 is a side elevation of the baling-press with the plunger pressed rearwardly and about to be released. Fig. 2 is a top plan view of the press in the position shown in Fig. 1. Fig. 3 is a view similar to Fig. 2, with the parts in the positions that they assume when the plunger is released, a portion of the frame in which the cam is mounted being broken away to more clearly show the spring-plate behind which the cam engages when the plunger is released. Fig. 4 is a perspective view showing the front end portion of the press-frame with the plunger, the cam, and the sweep removed. Fig. 5 is a detail perspective view of the cam-shaft with the cam thereon and the attached end of the sweep. Fig. 6 is a detail perspective view of the outer end portion of the plunger.

Referring now to the drawings, the present press includes the longitudinal sills 10 and 11, upon the rear end portion of which is mounted the baling-chamber 12, from the rear of which extends the discharge-chute 13, the baling-chamber having a hopper 14, through which the material to be pressed is passed to the baling-chamber.

Upon the forward end portions of the sills 10 and 11 are mounted the metal straps 15 and 16, respectively comprising the horizontal feet 17 and 18, which are directly secured upon the sills, and from the front end portions of which feet the straps extend upwardly and then rearwardly above and parallel with the upper edges of the sills, where they are secured upon the cross-beam 19. Below the beam 19 is a cross-beam 20, which is mounted directly upon the sills 10 and 11, the beams 19 and 20 being spaced vertically, as illustrated. The beams 19 and 20 are connected by the vertical posts 21, 22, and 23, and upon which posts 22 and 23 are rotatably mounted the vertical rollers 24 and 25.

A plunger 26 is provided having a head 27 of common form, which operates in the baling-chamber, the opposite end of the plunger being laterally offset, as shown at 27′, and passed slidably between the rollers 23 and 24, so that as the plunger is reciprocated in the manner hereinafter described the friction is reduced to a minimum. The plunger is held normally and yieldably with the head retracted by means of a helical spring 29, which is attached at one end to the plunger and at the opposite end to the cross-beam 20. The plunger is held normally and yieldably by the spring 29 with the shoulder 30, which is at the base of the offset portion of the plunger, against the roller 24, which roller acts as a stop to limit the return movement of the plunger after it has been operated upon to press the bale.

Let into the lower edges of the sills 10 and 11 is a cross-beam 31, having a bearing 32 formed therein, which receives the lower reduced end of a shaft 33, the upper portion of which has a bearing between a cross-beam 34 and a strap 35, said cross-beam being mounted upon the metal straps 15 and 16. Brace-irons 35' extend from the rear ends of the straps 15 and 16 to the cross-beam 34, upon which they are bolted by means of bolts 36, which pass through the brace-irons, the cross-beam, and the metal straps and hold them securely together.

Upon the shaft 33 is mounted a cam comprising vertically-spaced elliptical skeleton plates 38 and 39, between the ends of which are rotatably mounted the vertical rollers 40 and 41, a cylindrical drum 43 being disposed vertically between the skeleton plates and midway between the rollers, the skeleton plates being secured to the ends of this drum. The shaft passes vertically through the drum and centrally thereof. The cam-shaft is mounted in such position that when rotated the rollers at the ends thereof will successively engage the free end of the plunger, rotation of the cam after engagement of a roller with the plunger serving to press the plunger and move it longitudinally to carry the plunger-head rearwardly through the baling-chamber. The engaged cam-roller has a rolling movement first in one direction and then the other transversely of the free end face of the plunger and finally passes from the plunger. As the plunger moves by action of the cam, the helical spring, above referred to, is placed under tension, and when the plunger is released the helical spring serves to return the plunger and retract the plunger-head. As the cam-rollers successively engage the plunger, as the cam is rotated the plunger is pressed rearwardly and released, so that two reciprocations are given to the plunger for each complete rotation of the cam.

To prevent excessive wear of the end of the plunger, as also the side faces thereof, it is provided with a metal shoe 45, it being understood that as the direction of pressure of the cam-rollers against the plunger changes the plunger is forced first to one side and then to the other into engagement with the adjacent guide-rollers interchangeably.

To the upper end of the cam-shaft is connected a sweep 50, having draft appliances 51 at one end for hitching draft-animals. While either of the cam-rollers is in engagement with the end of the plunger there is a resistance to the movement of the sweep, and ordinarily when a roller leaves the end of the plunger the sweep springs forward because of relief of this resistance, and the sweep strikes the draft-animals. To prevent this lost motion of the sweep, a spring-plate 50' is secured to the side of the offset portion of the plunger and is bent outwardly or away from the plunger and then forwardly and parallel with it, so that when a plunger is released and springs forwardly under the influence of the return-spring the roller which has just left the end of the plunger is received between this spring-plate and the face of the plunger, and this spring-plate resists the rotation of the cam until the second roller engages the end of the plunger, at which time the first roller passes from behind the spring-plate, which having been displaced at its outer end springs back to its normal position.

The baling-chamber of the press is provided with the strengthening-uprights 51 at the sides thereof, and to the front upright of the opposite sides of the press are connected the ends of a metal strap 54, through the central portion of which is engaged a bolt-rod 55, having a hook 56 at its forward end which is engaged in a perforation in a plate 57, secured to the cross-beam 19. A nut 59 is engaged with the bolt-rod in the rear of the metal strap to place the rod under tension, this rod acting as a tie-rod to counteract the strains incident to the pressing operation.

In practice modifications of the specific construction shown may be made and any suitable materials and proportions may be used for the various parts without departing from the spirit of the invention.

Secured upon the feet of the straps 15 and 16 is a cross-brace 60.

It will be noted that the central drum in the cam lies with its periphery in close relation to the side face of the plunger, so that it serves as a further guide for the plunger.

What is claimed is—

1. A baling-press comprising a baling-chamber, a plunger, a double cam constructed and arranged for engagement of its members successively with the plunger to operate the latter in one direction, means for returning the plunger when released by the cam, and yieldable means carried by the plunger and disposed for engagement by either member of the cam when the other member is out of engagement with the plunger and the latter is retracted, for retarding the movement of the cam.

2. A baling-press comprising a baling-chamber, a plunger, a double cam constructed and arranged for engagement of its members successively with the end of the plunger, means for returning the plunger when released by the cam, and a spring-plate carried by the plunger and behind which either member of the cam is adapted to engage when the other member is out of engagement with the plunger and the latter is retracted, said spring-plate being adapted to be placed under tension to retard the movement of the cam when the latter is out of engagement with the plunger.

3. A baling-press comprising a baling-chamber, a reciprocatory plunger, a frame having guide-rollers between which the outer end of the plunger is slidably received, a vertical shaft mounted in said frame, a drum upon the shaft, vertically-spaced plates secured to the end of the drum, rollers mounted between the end portions of the plates in position for successive engagement with the end of the plunger to move it in one direction and subsequently release it, said plunger having a shoulder spaced rearwardly from its cam-engaging end in position to receive either end of the cam when it leaves the end of the plunger, a spring-plate carried by the plunger in the path of movement of the cam from the shoulder, and a sweep connected with the shaft.

In testimony whereof we affix our signatures in presence of two witnesses.

WILLIAM KRUSE.
THEODOR M. VANDERWERTH.

Witnesses:
S. W. WILLARD,
W. R. LITTE.